(12) United States Patent
Benham

(10) Patent No.: US 10,020,524 B2
(45) Date of Patent: *Jul. 10, 2018

(54) PRESSURE DENSITY DIFFERENTIAL DEVICE

(71) Applicant: Roger A. Benham, San Diego, CA (US)

(72) Inventor: Roger A. Benham, San Diego, CA (US)

( * ) Notice: Subject to any disclaimer, the term of this patent is extended or adjusted under 35 U.S.C. 154(b) by 463 days.

This patent is subject to a terminal disclaimer.

(21) Appl. No.: 14/743,473

(22) Filed: Jun. 18, 2015

(65) Prior Publication Data

US 2015/0288012 A1 Oct. 8, 2015

Related U.S. Application Data

(63) Continuation of application No. 13/668,766, filed on Nov. 5, 2012, now Pat. No. 9,088,019, which is a continuation-in-part of application No. PCT/US2011/035331, filed on May 5, 2011.

(60) Provisional application No. 61/282,998, filed on May 5, 2010.

(51) Int. Cl.
| | |
|---|---|
| *H01M 4/36* | (2006.01) |
| *H01M 8/04082* | (2016.01) |
| *H01M 8/20* | (2006.01) |
| *H01M 14/00* | (2006.01) |
| *H01M 8/04089* | (2016.01) |
| *H01M 8/04186* | (2016.01) |
| *H01M 8/18* | (2006.01) |
| *H01M 10/36* | (2010.01) |

(52) U.S. Cl.
CPC ... *H01M 8/04201* (2013.01); *H01M 8/04104* (2013.01); *H01M 8/04186* (2013.01); *H01M 8/188* (2013.01); *H01M 8/20* (2013.01); *H01M 14/00* (2013.01); *H01M 10/36* (2013.01); *Y02E 60/50* (2013.01); *Y02E 60/528* (2013.01)

(58) Field of Classification Search
CPC ......... H01M 8/04201; H01M 8/04186; H01M 8/04104; H01M 8/20; H01M 8/188; H01M 10/36; H01M 14/00; Y02E 60/50; Y02E 60/528

See application file for complete search history.

(56) References Cited

U.S. PATENT DOCUMENTS

| | | |
|---|---|---|
| 3,357,860 A | 12/1967 | Stachurski |
| 3,523,829 A | 8/1970 | McCully |
| 4,465,964 A | 8/1984 | Cover |
| 4,486,701 A | 12/1984 | Cover |
| 6,042,960 A | 3/2000 | DaCosta et al. |
| 6,143,443 A * | 11/2000 | Kazacos ............... H01M 8/188 |
| | | 429/188 |
| 6,387,569 B1 | 5/2002 | Licht |
| 9,088,019 B2 * | 7/2015 | Benham .................. H01M 8/20 |
| 2006/0060464 A1 | 3/2006 | Chang |

(Continued)

*Primary Examiner* — Raymond Alejandro
(74) *Attorney, Agent, or Firm* — Welsch Flaxman & Gitler LLC

(57) ABSTRACT

An electrochemical cell provided with two half cells. A pressure or density differential is created between the cathode and anode electrodes, each of which is contained in one of the half cells. The pressure or density differential is created by single or multiple sources including compression, vacuum, weight (gravity) of mass, chemical, molecular, or, pressure or density differentials created by thermal gradients.

3 Claims, 5 Drawing Sheets

(56) References Cited

U.S. PATENT DOCUMENTS

| | | |
|---|---|---|
| 2006/0116663 A1 | 6/2006 | Joshi et al. |
| 2009/0159454 A1 | 6/2009 | Machado et al. |
| 2010/0003545 A1 | 1/2010 | Horne et al. |
| 2010/0101942 A1 | 4/2010 | Pless |

* cited by examiner

PRESSURE DENSITY DIFFERENTIAL DEVICE

CROSS-REFERENCED APPLICATIONS

The present patent application is a continuation of U.S. patent application Ser. No. 13/668,766, filed Nov. 5, 2012, which is U.S. Pat. No. 9,088,019, which is a continuation-in-part of PCT application Serial No. PCT/US11/35331, filed May 5, 2011 which claims the benefit of provisional patent application Ser. No. 61/282,998, filed May 5, 2010.

FIELD OF THE INVENTION

The present invention relates to using a pressure or density differential between two electrodes, and/or two electrically conductive media, and/or two electrolytes, to produce an electrochemical cell. The pressure or density differential could be created by single or by multiple sources including compression, vacuum, weight (gravity) of mass, resonance, vibration, motion, electromagnetic waves (including light), chemical, molecular, or pressure or density differentials created by thermal gradients.

BACKGROUND OF THE INVENTION

Many different configurations of electrochemical cells exist, including galvanic and primary cells, secondary cells, cells with liquid, solid, hydrous, or anhydrous electrodes and electrolytes. There are vast numbers of electrode and electrolyte materials used to create cells with different voltage and electrical current characteristics. A widely used application of electrochemical cells is to produce batteries to store or generate electrical current.

The abovementioned electrochemical cell designs all have their shortcomings. The present invention is designed to create an improved electrochemical cell device to help overcome the disadvantages of the existing art.

Some benefits include:
Ability to produce electrical energy from pressurized gas
Ability to convert mechanical energy to electrical energy
Potential to store large amounts of electrical energy in the form of pressurized gas
Lightweight compared to other electrochemical cells
More efficient than traditional electrochemical cells
Can be made without precious or scarce materials
Can be made without hazardous chemicals All of these features are important to create an improved manner of producing reliable and efficient power and work from potential energy sources. This invention results in more options for the consumer and a cleaner environment.

SUMMARY OF THE INVENTION

The present invention is directed to an electrochemical cell, which overcomes at least one of the abovementioned disadvantages or provide the consumer with a useful or commercial choice.

With the foregoing in view, the present invention in one form, resides broadly in a circuit configured to produce electrical current in a conductor that is part of an electrochemical cell composed of two electrodes, including a cathode and an anode, and a conductive electrolyte. According to the present invention, the conductive electrolyte adjacent to one electrode exhibits a different density than the conductive electrolyte adjacent to the second electrode. This density differential is created by the application of a different pressure to each of the two electrolytes, thereby producing an electrical potential (voltage) differential which causes electrical current to flow through the electrochemical cell. The conductive electrolyte, or electrolytes, could include conductive solids, fluids or conductive gases (plasmas). The density differential could be a surface phenomenon associated with the electrodes, whether the electrodes are classified as inert or not, in which a pressure differential between the two electrodes creates a density differential on the surface of the electrode resulting in an electrical potential (voltage) differential between the electrodes and the associated electrical current flow within the circuit of the electrochemical cell.

The science of creating plasmas is well established. For over a century, researchers and scientists have experimented with the phenomenon associated with creating electrically conductive gases (plasmas). It has been stated in the literature of the physical sciences that plasma, or ionized gases, are a fourth state of matter, including solids, liquids, gases, and the fourth, plasma. Much of this work included using relatively high voltages across two electrodes to create discharge glows and electric arcs. The electrically conductive plasmas used in this invention can be created using any means including, but not limited to, electric and/or magnetic fields, direct and alternating currents, radio frequencies, microwaves, radioactive materials including alpha, beta, and gamma radiation, and electron or ion fluxes in any form. The forms of plasma produced by these means can be in any form of plasma including, but not limited to, glow discharge plasma, capacitively coupled plasma, inductively coupled plasma, wave heated plasma, arc discharges, corona discharges, dielectric discharges, or capacitive discharges.

Various configurations, modifications, and additions can be added to modify and improve the operating characteristics of this invention. For example, the electrolyte or electrodes could be any combination of conductive solids, ionic gases (plasma), and liquids. The cells could be arranged in series or in parallel. A variety of membranes could be used to create the pressure differential within the electrolyte, including woven membranes, porous media, restrictive valves, or solid electrolytes. No membrane would be required if columns and gas pressures (vacuums) were used to create the pressure differential.

BRIEF DESCRIPTION OF THE DRAWINGS

Various embodiments of the invention and appurtenances will be described with reference to the following drawings, in which.

DETAILED DESCRIPTION OF THE PREFERRED EMBODIMENT

With reference to FIGS. 1 through 5, the present invention will be explained. It is here noted that the traditional application of "electrical current" is used, where the electrical current direction is opposite of the electron flow direction.

Figure 1:
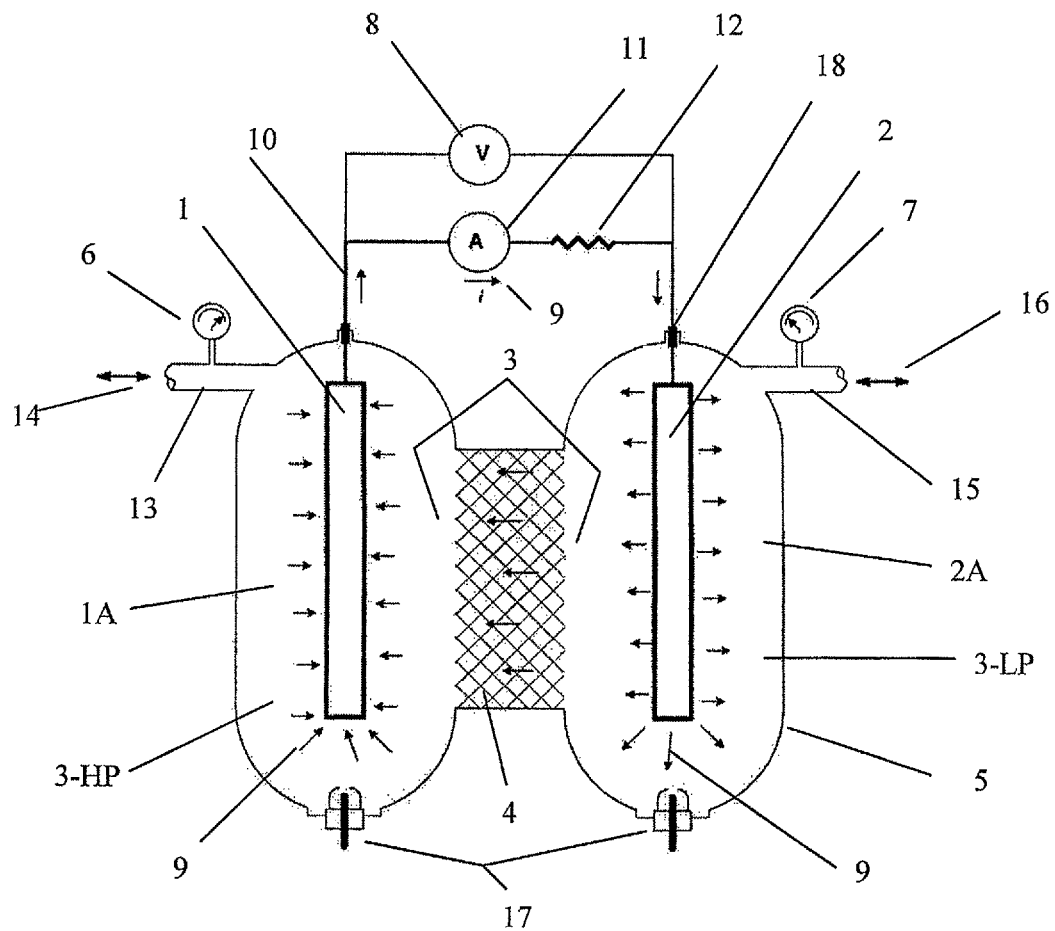
FIG. 1 shows an electrochemical cell using a conductive plasma as the electrolyte of the invention.

FIG. 1 shows an electrochemical cell provided with a cathode half cell and anode half cell using a plasma, such as a conductive ionic gas for the electrolyte. These half cells are connected in series with one another.

In reference to FIG. 1, an electrochemical cell including a cathode electrode 1 and an anode electrode 2, are each surrounded by a conductive plasma 3 having a higher pressure section 3-HP and a lower pressure section 3-LP. A cathodic electrode region 1A is separated from an anodic electrode region 2A by a conductive membrane 4. The conductive membrane 4 could be a conductive solid, a conductive or non-conductive semi-permeable material, a porous material, a non-conductive semi-permeably base material with a impregnated conductive material (solid, liquid, or gaseous plasma), or any material with a conductive quality and in any position that serves the purpose of creating the desired circuit path and reactions. The described components, including the cathode electrode 1, the anode electrode 2, the conductive gas plasma 3, and the conductive membrane 4, are all housed in a pressure (or vacuum) containment housing 5. To avoid short-circuiting around the electrolyte the pressure (or vacuum) containment housing 5 should be a non-conductive material, lined with a non-conductive coating, or double-walled with a nonconductive inner vessel (not shown) providing the electrical isolation necessary to produce an electrically isolated condition with the desired circuit path maintained within the electrochemical cell.

A pressure differential is created between the cathode electrode region 1A and the anode electrode region 2A. The existence of this pressure differential is evidenced by the pressure gauges 6, 7. The pressure gauge 6 shows the pressure at the cathodic region 1A and the second pressure gauge 7 shows the pressure at the anodic region 2A. It is noted that the term "pressure" also denotes a vacuum or partial vacuum condition. For the purpose of explanation, the higher versus lower pressure difference between the cathode electrode 1 and the anode electrode 2 is arbitrary, although research work by the inventor does indicate that to produce the desired voltage, current and flow direction, the pressure (or, density) associated with the cathode electrode 1 would generally be higher than that associated with the anode electrode 2. In this embodiment of the invention, the pressure differential is maintained by the plasma (or gas) flow resistance created by the conductive membrane 4, which could range from a zero flow condition (100% restricted) to a low pressure drop of less than a couple of p.s.i. (pound per square inch). The conductive membrane 4 could be in any position and orientation relative to the electrodes 1, 2 including partially or completely surrounding the electrodes 1, 2, and comprised of any suitable material or chemistry combination that provides the necessary electrical, electrolytic, or gas flow characteristics, including a solid, reinforced membrane with liquid or gel, semi-permeable conductive membrane with hydrous or anhydrous components, or the like.

In one mode of operation, during an open-circuit operation, a voltage occurs between the cathode electrode 1 and the anode electrode 2 due to the pressure and density differential between the plasma occurring in cathodic region 1A and the anodic region 2A, or due to the naturally occurring voltage or potential difference between the two conductive plasmas 3-HP and 3-LP. This voltage is measured in an open circuit condition with a voltage meter 8 placed across the cathodic electrode 1 and the anode electrode 2. Again, it is emphasized that the voltage measured between the cathode electrode 1 and the anode electrode 2 could be due to a number of potential sources, including the natural (electromotive or galvanic) voltage difference between the elemental or molecular species of the conductive plasma or electrode materials, the pressure differential affects on the conductive plasma, or the pressure differential affects on the elemental, molecular, or density properties of either the plasma or the electrode materials. An explanation regarding the electrochemical phenomenon occurring in the pressure density differential device, or Density™ brand of voltaic pile, is provided in the writings of the inventor, including the story, presently titled, Full Circle—The Fundamental Nature of the Universe, incorporated by reference herein.

In one mode of operation, during a closed-circuit operation, a voltage differential measured across the volt meter 8 created by the invention causes electrical current 9 to flow through a conductor 10 placed between the cathodic electrode 1 and the anode electrode 2. The electric current 9 is shown passing through an ammeter 11 and a resistor 12. The resistor 12 represents work being conducted by the electrical current 9.

A cathode region port 13 is provided on one side of the cathodic electrode 1, allowing a cathodic gas 14 to flow into or out of the cathodic region 1A of the cell. An anode region port 15 is provided on one side of the anode electrode 2 allowing an anodic gas 16 to flow into or out of the anodic region 2A of the cell. Gas downstream, remote or away from the containment housing 5, within the cathodic region port 13 and the anodic region port 15 could be non-ionized gas or conditioned by any means necessary to maintain electrical isolation of the plasma within the containment housing 5 in order to maintain the defined circuit. The cathodic region port 13 and the anodic region port 15 are one manner of adding or subtracting fluid (gas) to change pressure and density of the fluid in the containment housing 5. The movement of the cathodic gas 14 and the anodic gas 16 is produced by attaching a pump or a source of vacuum to the cathodic region port 13 and the anodic port 15 to provide the pressure differential.

As shown in FIG. 1, in a preferred embodiment of the invention, the electrochemical cell is configured with an ionization generator 17. The ionization generator 17 could be an electrostatic spark generator, a plasma arc device, a coated or uncoated filament, a laser ionization device, a heat source, a glow-plug, a radioactive ionization element, a source of alpha, beta, or gamma ionization radiation, an electromagnetic wave source (including microwave, alternating current, direct current, radio frequency, light source) or any method capable of generating ionized gas or plasma. The ionization generators 17 could be placed in any position or orientation in the containment housing 5 relative to the cathode or anode electrodes 1, 2, including radially, horizontally, vertically, in between, inside, or outside. The purpose of the ionization generator 17 is to produce the initial, or continuous, volume of ionized gas or plasma that produces the measured voltage differential 8 and subsequent electrical current 9. Generally, once the electrical current 9 begins to flow, the conductive gas or plasma 3 can be self perpetuating.

The containment vessel 5 can be configured to have a double wall or separate inner vessel (not shown). The double wall or separate inner vessel (not shown) can function as a shield to isolate the containment vessel 5 from the plasma 3. The double wall or separate inner vessel (not shown) can be a manner of confining the plasma 3 to a specific area, for example, keeping the plasma in contact with the electrodes 1, 2, or preventing hot plasma 3 from rising up and away from the electrodes 1, 2. The plasma 3 can also be moved or isolated in a specific areas of the containment vessel 5 or separate inner vessel (not shown) by means of magnetic fields produced by electromagnets (not shown), or the like. The science of plasma containment has been the primary scope of the fusion energy programs in various countries over the past approximately four decades.

As shown in FIG. 1, in this preferred embodiment, there would be an electrical isolation device 18 between the both the cathode electrode 1 and the anode electrode 2, and the containment housing 5. The electrical isolation device 18 could be virtually any non-conductive material, such as, but not limited to, plastic, rubber, ceramic or the like. Furthermore, there would be electrical isolation between whatever circuit components are necessary to maintain the electrical current flow 9 along the desired and defined circuit. As previously discussed, according to standard conventions for the electrical circuit of an electrochemical cell, the electrical current 9 would flow through the conductor 10 from the cathode 1, through the ammeter 11, through the resistor 12 (representing the work conducted by the circuit), to the anode electrode 2, from the anode electrode 2 to the anodic region 2A of the conductive plasma, through the conductive plasma 3-LP, through the conductive membrane 4, through the conductive plasma 3-HP toward the cathodic region 1A, from the cathodic region 1A of the plasma to the cathode electrode 1, through the conductor 10, and again back to the ammeter 9, thus defining a complete circuit.

Figure 2:
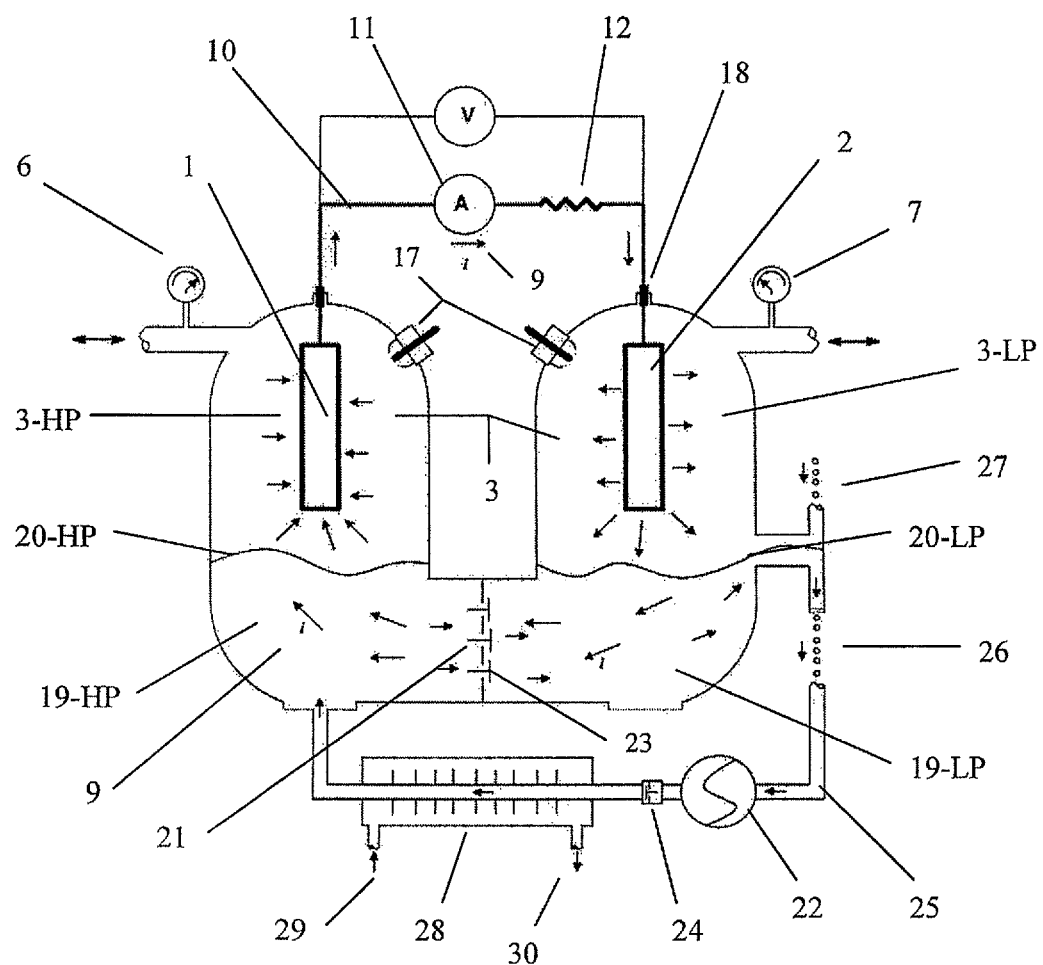
FIG. 2 shows an illustration of an electrochemical cell, a conductive plasma electrolyte, a liquid electrolyte, a pump, and a valved membrane designed to create a pressure differential between the electrodes of the cell.

FIG. 2 shows an illustration of an electrochemical cell with components of the invention, comprising a cell using a conductive gas or plasma electrolyte, a liquid electrolyte, a pump, and a valved membrane designed to create a pressure differential between the electrodes. The electrochemical cell includes a cathode half cell and an anode half cell.

In the embodiment shown in FIG. 2, the cathodic electrode 1 and the anode electrode 2 are configured to be in contact with a conductive plasma 3. A liquid electrolyte bridge having a higher pressure side 19-HP and a lower pressure side 19-LP is separated from the conductive plasma 3 by a liquid electrolyte boundary 20-HP and 20-LP. Therefore, the liquid electrolyte bridge 19-HP and 19-LP does not directly contact the cathodic electrode 1 and the anodic electrode 2. A valved membrane 21 is provided between the sections 19-HP and 19-LP of the liquid electrolyte bridge. In this preferred embodiment the valved membrane 21 is comprised of a plurality of small constrictor valves 23.

The ionization generators 17 are located above the liquid electrolyte boundary 20-HP and 20-LP, and are used to initially or continuously create the conductive plasma 3. When the invention causes electrical current 9 to flow in the circuit, the electrical current would move from the anode electrode 2, into and through the conductive plasma 3-LP, toward and through the liquid electrolyte boundary 20-LP. The current would then travel into the lower pressure portion 19-LP of the electrolyte bridge and through the valved membrane 21 into the higher pressure liquid electrolyte bridge 19-HP section. The electrical current would then proceed through the boundary layer 20-HP, into the conductive plasma 3-HP, onto the cathode electrode 2, then through the conductor 10, through the ammeter 11, through the resistor 12 (load) and then back to the anode electrode 1, thereby completing the circuit.

As shown in FIG. 2, in the preferred embodiment a mechanical pump 22 is provided that assists in creating the pressure differential between the two electrode chambers of conductive plasmas 3-HP and 3-LP. This pressure differential can be achieved by any single or by multiple sources including compression, vacuum, weight (gravity) of mass, resonance, vibration, motion, electromagnetic waves (including light), chemical, molecular, or pressure or density differentials created by thermal gradients. The pressure differential between the two electrode chambers of conductive plasmas 3-HP and 3-LP can be created or controlled by adding or removing gas from the cathodic region port 13 and the anodic port 15.

In the embodiment shown in FIG. 2 the pressure differential between the two electrode chambers of conductive plasmas 3-HP and 3-LP also occurs due to the constriction created by small constrictor valves 23 provided in the valved membrane 21. The constrictor valves 23 would be configured in forced-closed position by any suitable spring mechanism to cause a pressure drop across the valved membrane 21, and be comprised of any suitable material including for example, metallic, elastomeric, or ceramic material. The pressure differential is further maintained by the addition of a check valve 24 located in conduit tubing 25 provided downstream of the pump 22. A mechanical or gas pressure reservoir (not shown) can be used to limit continuous pumping operations and help maintain the pressure in the containment vessel 5 on the high pressure side downstream of the check valve 24. It is noted that the pressure or density differential does not rely on the use of the valved membrane 21 and could be created using a solid electrolyte (not shown) or by single or by multiple sources including compression, vacuum, weight (gravity or head pressure in a column) of mass, resonance, vibration, motion, electromagnetic waves, chemical, molecular, or pressure or density differentials created by thermal gradients.

Also shown in FIG. 2 is a first dielectric trap 26 maintaining dielectric isolation between the pumping circuit between the two half cells, namely the high pressure side and the low pressure side. A second dielectric trap 27 is used to replenish the electrolyte to the electrochemical cell. Also shown, is a cooling or heating system 28 to control the temperature of the electrolyte bridge materials with a heat transfer media inlet 29 and outlet 30 to transfer heat to or from the electrolyte bridge materials. It is noted that the heat transfer to the system could be by any means and at any location, including directly through the containment housing 5, as may be the case if the electrolyte bridges 19-LP and 19-HP are higher temperature materials such as molten metal or ionic liquids (molten salts & eutectic salts). In a preferred embodiment, the liquid electrolyte bridges 19-LP and 19-HP are liquid mercury. In a preferred embodiment the conductive plasmas 3-LP and 3-HP are ionized gases of mercury. The dielectric traps 26 and 27 include a plurality of liquid drops separated from one another by air, producing an infinite resistance thereby preventing any electrical current from flowing through the conduit tubing 25 from the anodic half cell to the cathodic half cell. Similar to the half cells in FIG. 1, the half cells illustrated in FIG. 2 are connected in series with one another.

As shown in FIG. 2 a fluidic flow circuit is formed between the two half cells, namely the high pressure side and the low pressure side, 3-LP and 3-HP, the circuit being described as follows. In this preferred embodiment the electrolyte bridge 19-LP is routed through the conduit tubing 25 to the mechanical pump 22. The mechanical pump 22 transfers the fluidic electrolyte bridge material into the cooling or heating system 28, then through additional conduit tubing 25 to higher pressure electrolyte bridge 19-HP. The pressure differential between the two half cells then causes the higher pressure electrolyte bridge 19-HP to purge past the valved membrane 21 thus completing the circuit of the electrolyte bridge.

Regarding the electron transport that occurs through the electrode and plasma interface, according to electron transport models developed by the inventor, it is noted that the electrons may not travel by the mechanism that occurs in a traditional electrochemical cell. In a traditional electrochemical cell an oxidation reaction (Me→Me$^+$+e$^-$) occurs at the anode electrode and a reduction reaction (Me$^+$+e$^-$→Me) occurs at the cathode electrode. However, the electron transport that occurs between the electrodes 1, 2 and the conductive plasma 3 in the described invention includes mechanisms of conduction, arc columns, and or glow discharges that can be shown to occur with little or no evident oxidation or reduction chemical reactions. The electron transport that occurs between the conductive plasma 3 and the liquid electrolyte bridges 19-LP and 19-HP can also be shown to occur with little or no evident oxidation or reduction chemical reactions. The voltage gradient and electron flow between the electrodes 1, 2 could be similar to the mechanism of voltage and current flow behaviour observed in some photovoltaic cells including mechanisms of reversible reduction and oxidation reactions.

It is also noted again that the voltage differential that occurs in FIG. 2 between the cathode electrode 1 and the anode electrode 2 could be due to a number of potential sources, including the natural voltage difference (electromotive or galvanic) between the elemental or molecular species of the conductive plasmas, electrode materials, or liquid electrolytes, the pressure differential effects on the conductive plasma, or the pressure differential effects on the elemental, molecular, or density properties of either the plasma, electrolyte, or the electrode materials. The voltage difference occurring between conductive materials of differing densities is related to new and fundamental scientific discoveries made by the inventor.

Figure 3:
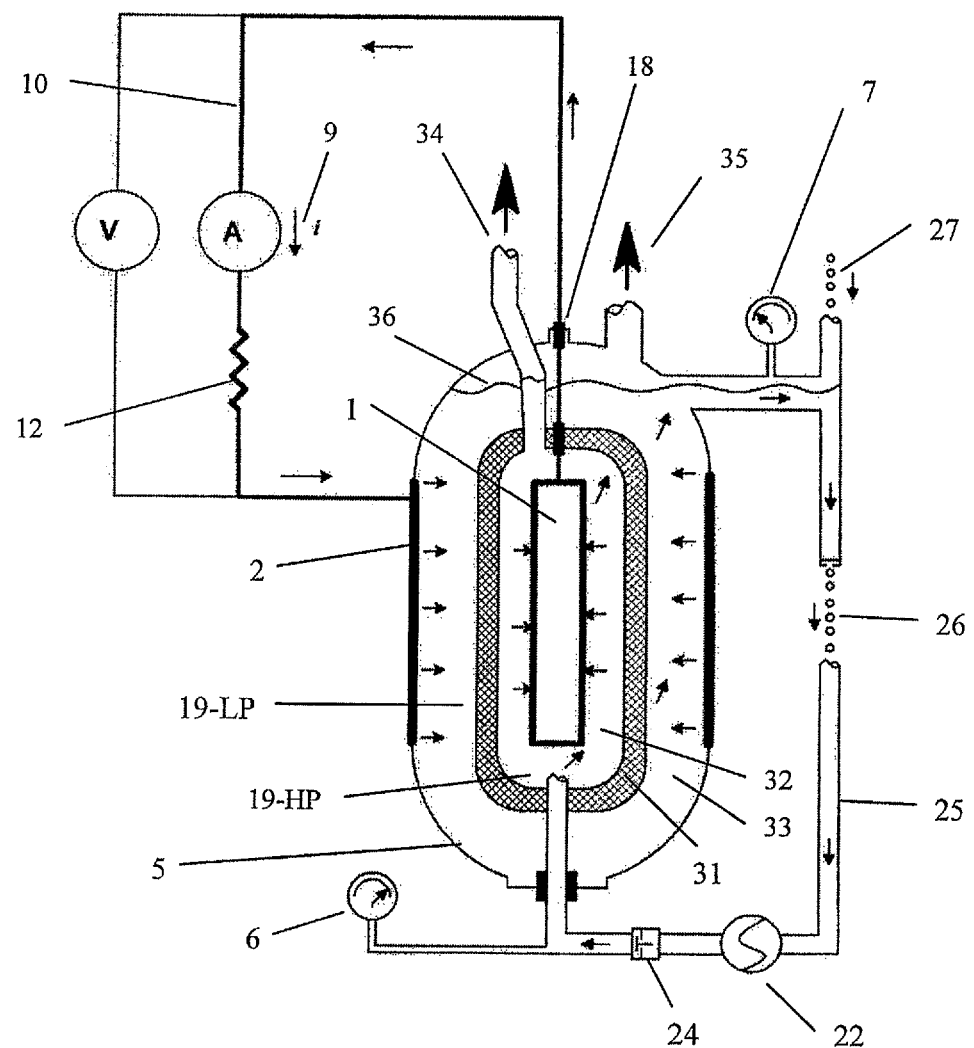
FIG. 3 shows an electrochemical cell using a liquid electrolyte.

FIG. 3 shows an illustration of an electrochemical cell with components of the invention, comprising a cell using a liquid electrolyte, a pump, and an enclosed semi-permeable conductive membrane designed to create a pressure differential between two electrodes.

During operation of the pressure density cell as configured FIG. 3, the cathode electrode 1 and the anode electrode 2 are configured to be in contact with the liquid electrolyte bridges 19-HP and 19-LP, respectively. The liquid electrolyte bridges 19-HP and 19-HP can be comprised of a hydrous, anhydrous, metallic, or ionic media (molten eutectic salt for example). The cathode electrode 1 and the anode electrode 2 are separated by an enclosed semi-permeable conductive membrane 31, wherein one of the electrodes, in this case the cathode electrode 1, is encased by the enclosed semi-permeable conductive membrane 31. The encasement of the cathode electrode 1 by the enclosed semi-permeable conductive membrane 31 allows for a cathodic annulus space 32 to be formed between the cathode electrode 1 and the enclosed semi-permeable conductive membrane 31. A second annulus, the anodic annulus space 33, is formed between the semi-permeable conductive membrane 31 and the wall of the containment vessel 5. In the configuration shown in FIG. 3 the anode electrode 1 is incorporated into the wall of the containment housing 5.

When electrical current 9 flows in the circuit of the electrochemical cell shown in FIG. 3, it flows from the anode electrode 2, into the lower pressure liquid electrolyte 19-LP that is provided in the anodic annular space 33, then through the enclosed semi-permeable conductive membrane 31. The electrical current 9 then flows into the liquid electrolyte 19-HP on the higher pressure side in the cathodic annular space 32, and then onto the cathode electrode 1. The electrical current would then continue to flow through the conductor 10, through the ammeter 11, through the resistor 12 (load) and then back to the anode electrode 2, thereby completing the circuit.

As shown in FIG. 3, a mechanical pump 22 creates the pressure differential between the two electrode bridges of electrolytes 19-HP and 19-LP. The pressure differential also occurs due to the inclusion of the enclosed semi-permeable conductive membrane 31 through which the current flows. The enclosed semi-permeable conductive membrane 31 could be any material that allows a pressure differential to occur between the regions of electrolyte bridges 19-LP and 19-HP. The pressure differential is further maintained by the addition of a check valve 24 located in the conduit tubing 25 downstream of the pump 22. It is again noted that the pressure differential could be provide by any source cited previously, including any mechanical, gravitational (head pressure), or thermal gradient.

Also shown in FIG. 3, the first dielectric trap 26 maintains dielectric isolation between the pumping circuit and the two half cells, namely the high pressure side and the low pressure side. The second dielectric trap 27 is shown for the addition of make up fluid to the electrochemical cell, if it is necessary to maintain electrical isolation. Similar to the half cells shown in FIGS. 1 and 2, the half cells shown in FIG. 3 are also arranged in series.

Regarding the embodiment shown in FIG. 3, the electron transport can occur through the cathodic and anode electrodes and the electrolyte by the mechanism that occurs in electrochemical cells, including electrochemical reactions in hydrous, anhydrous, or photovoltaic cells. A reduction reaction (Me$^+$+e$^-$→Me) may occur at the cathode electrode 1 and an oxidation reaction (Me→Me$^+$+e$^-$) may occur at the anode electrode 2. In the configuration shown in FIG. 3 the reduction and oxidation reactions could be gas evolution reactions, where the gases evolved on each electrode could be collected by means of output vents, including a cathodic output vent 34 and an anodic output vent 35. The gases, for example hydrogen gas (reduction product) and oxygen gas (oxidation product) would be collected as usable and marketable end products. Restricting the flow of gases at the cathodic output vent 34 and the anodic vent 35 could produce gas pressures that could be used to conduct work by pushing a piston or turbine, and cause pressure differentials needed to produce the density differential between the half cells, and therefore the voltage, current and power outputs. It is also noted that in each the cathodic annular space 32 and the anodic annular space 33 there could be a liquid-gas boundary 36.

It is noted that the voltage differential that occurs in FIG. 3 between the cathode electrode 1 and the anode electrode 2 could be due to a number of potential sources, including the natural (electromotive or galvanic) voltage difference between the elemental or molecular species of the electrolyte or electrode materials, the pressure differential effects on the electrolyte or electrode materials, the pressure differential effects on the elemental, molecular, density properties of either the electrolyte or the electrode materials, or yet to be discovered electrochemical phenomena.

It is noted that although FIG. 3 shows the cathode electrode 1 provided with the semi-permeable conductive membrane 31 and the anode electrode 2 provided on the wall of the containment vessel 5, the position of the electrodes can be reversed, with the cathode electrode being provided on the containment walls and the anode electrode provided within the semi-permeable conductive membrane.

Figure 4:
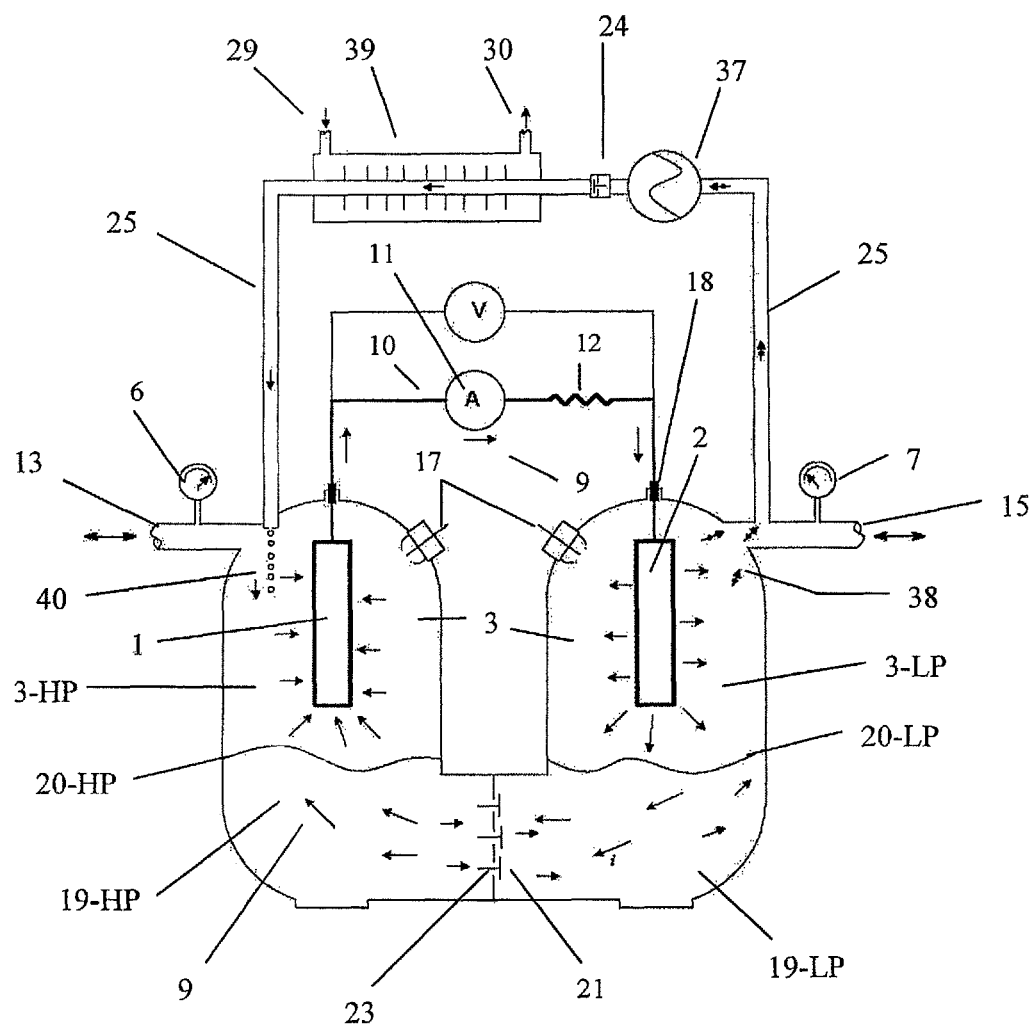
FIG. 4 shows an electrochemical cell including a conductive plasma electrolyte, a liquid electrolyte, a pump, a valved membrane, and a vaporization and condensation circuit designed to create a pressure differential between the electrodes of the cell.

FIG. 4 shows an illustration of an electrochemical cell with components of the invention, comprising a cell using a conductive gas or plasma electrolyte, a liquid electrolyte, a pump, a valved membrane, and a vaporization and condensation circuit designed to create a pressure differential between the electrodes. The electrochemical cell includes a cathode half cell and an anode half cell.

In the embodiment shown in FIG. 4, similar to the embodiment illustrated in FIG. 2, the cathodic electrode 1 and the anode electrode 2 are configured to be in contact with the conductive plasma 3. The liquid electrolyte bridge having a higher pressure side 19-HP and a lower pressure side 19-LP is separated from the conductive plasma 3 by the liquid electrolyte boundary 20-HP and 20-LP. Therefore, the liquid electrolyte bridge 19-HP and 19-LP does not directly contact the cathodic electrode 1 and the anodic electrode 2. The valved membrane 21 is provided between the sections 19-HP and 19-LP of the liquid electrolyte bridge. In this preferred embodiment the valved membrane 21 is comprised of a plurality of small constrictor valves 23.

The ionization generators 17 are located above the liquid electrolyte boundary 20-HP and 20-LP, and are used to initially or continuously create the conductive plasma 3. Examples of the types of ionization generators which can be utilized have been described with respect to the embodiment shown in FIG. 2. When the invention causes electrical current 9 to flow in the circuit, the electrical current would move from the anode electrode 2, into and through the conductive plasma 3-LP, toward and through the liquid electrolyte boundary 20-LP. The current would then travel into the lower pressure portion 19-LP of the electrolyte bridge and through the valved membrane 21 into the higher pressure liquid electrolyte bridge 19-HP section. The electrical current would then proceed through the boundary layer 20-HP, into the conductive plasma 3-HP, onto the cathode electrode 2, then through the conductor 10, through the ammeter 11, through the resistor 12 (load) and then back to the anode electrode 1, thereby completing the circuit.

As shown in FIG. 4, in the preferred embodiment a mechanical pump 37 is provided to assist in creating the pressure differential between the two electrode chambers of conductive plasmas 3-HP and 3-LP. In this preferred embodiment the mechanical pump 37 is configured to pump the vapor component 38 of the electrolyte bridge 19-LP through a cooling system 39, as will be described in more detail in latter paragraphs.

In the embodiment shown in FIG. 4 the pressure differential between the two electrode chambers of conductive plasmas 3-HP and 3-LP also occurs due to the constriction created by small constrictor valves 23 provided in the valved membrane 21. The constrictor valves 23 would be configured in a forced-closed position by any suitable spring mechanism to cause a pressure drop across the valved membrane 21, and be comprised of any suitable material including for example, metallic, elastomeric, or ceramic material. The pressure differential is further maintained by the addition of the check valve 24 located in conduit tubing 25 provided downstream of the pump 37. The pressure differential between the two electrode chambers of conductive plasmas 3-HP and 3-LP can also be created or controlled by adding or removing gas from the cathodic region port 13 and the anodic port 15.

Shown in FIG. 4 is a vaporization and condensation circuit between the two half cells, namely the high pressure side and the low pressure side, 3-LP and 3-HP, the circuit being described as follows: In this preferred embodiment a vaporized component 38 of the electrolyte bridge 19-LP is routed through the conduit tubing 25 to the mechanical pump 37. The mechanical pump 37 is configured to pump the vaporized component 38 and compress it in the cooling system 39, where it is condensed into a condensate component 40 of the electrolyte bridge 19-LP. The condensate component 40 is then routed through additional conduit tubing 25 to the cathodic region 3-HP and then back to the higher pressure electrolyte bridge 19-HP. The pressure differential between the two half cells then causes the higher pressure electrolyte bridge 19-HP to pass through the valved membrane 21, thus completing the circuit of the electrolyte bridge.

The cooling system 39 to configured to control the temperature of the condensate component 40 with a heat transfer media inlet 29 and outlet 30 to transfer heat from the condensate component 40.

Figure 5:
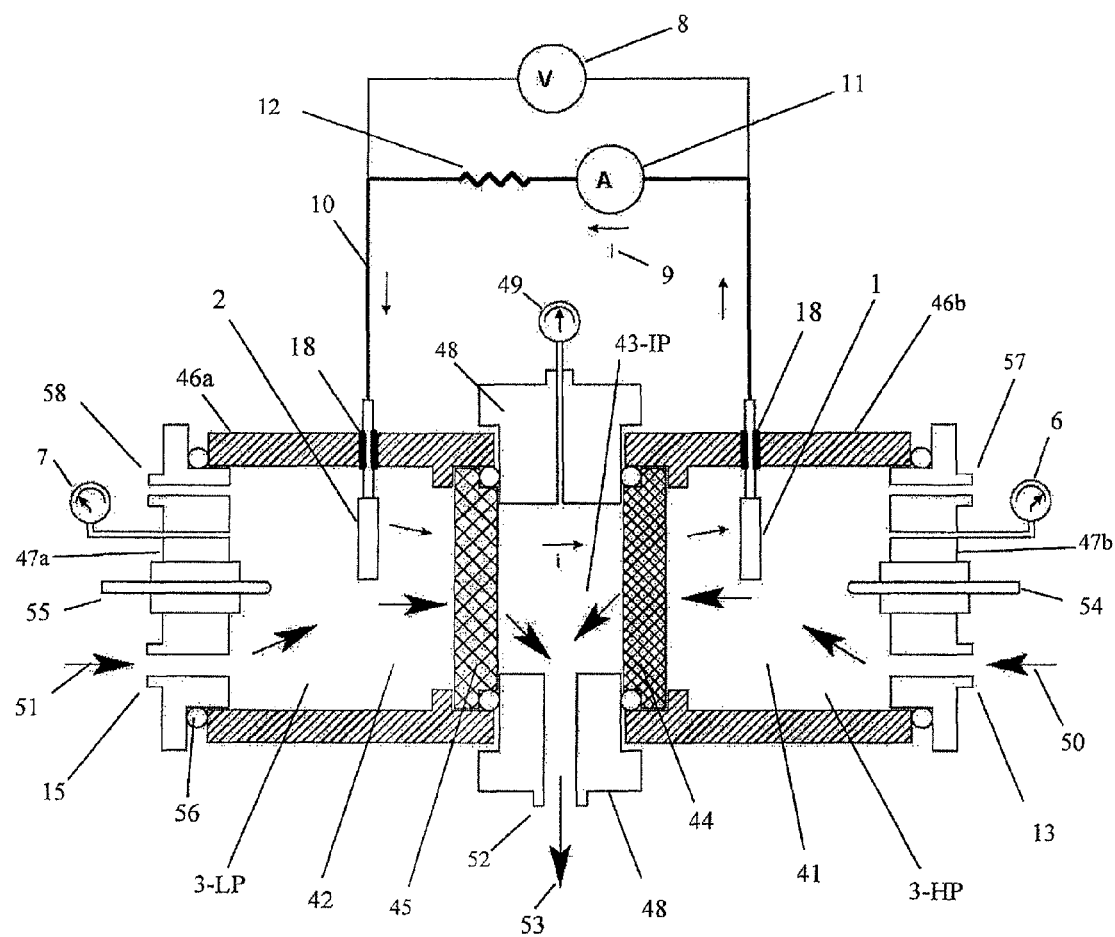
FIG. 5 shows a cross-section of an electrochemical cell with a cathode half cell and anode half cell, with an intermediate zone separating the two half cells.

In a preferred embodiment of FIG. 4, the liquid electrolyte bridges 19-LP and 19-HP are liquid mercury. In a preferred embodiment the conductive plasmas 3-LP and 3-HP are ionized gases of mercury. The vapor component 38 of the electrolyte bridge 19-LP would ideally be nonconductive gases producing an infinite resistance thereby preventing any electrical current from flowing through the conduit tubing 25 from the anodic half cell to the cathodic half cell. If necessary, dielectric traps 26 and 27 (as shown in FIG. 2) can be installed downstream of the mechanical pump 37 to maintain electrical isolation between the two half cells by way of the vaporization and condensation circuit FIG. 5 shows a cross-section of an electrochemical cell with a cathode half cell and anode half cell with an intermediate zone separating the two half cells. In the embodiment shown, the two half cells and the intermediate zone all operate at different pressures, with the intermediate zone generally operating at a pressure value between the pressure value of the two adjoining half cells. It is here noted that the invention illustrated in FIG. 5 could also incorporate electrolytes of differing chemistries and temperatures occurring in each of the half cells, with an intermediate chemistry, or temperature, occurring in the intermediate zone. Therefore, any discussion about applying or measuring pressure differentials would apply to chemistry or temperature differentials between the two half cells.

In reference to a preferred embodiment shown in FIG. 5, what is shown is an electrochemical cell having a cathode electrode 1 surrounded by a first electrolyte defined as the conductive cathodic region 41 and an anode electrode 2 surrounded by a second electrolyte defined as the conductive anodic region 42. The first conductive cathodic region 41 creates a higher pressure region 3-HP and the second conductive anodic region 42 creates a lower pressure region 3-LP. The higher pressure region 3-HP is separated from an intermediate pressure region 43-IP (where IP stands for "intermediate pressure") by a higher density porous membrane 44. The lower pressure region 3-LP is separated from the above described intermediate pressure region 43-IP by a lower density porous membrane 45. The higher density porous membrane 44 and the lower density porous membrane 45 could be conductive semi-permeable materials, non-conductive semi-permeable materials, or any material with a porosity and conductivity quality that serves the purpose of creating the desired flow rate, density, pressure drop, circuit path, and reactions.

The described components, including the cathode electrode 1, the anode electrode 2, the conductive regions 41 and 42, and the porous membranes 44 and 45, are all housed in a pressure (or vacuum) tight containment housing consisting of various components. In the embodiment shown, the pressure (or vacuum) tight containment housing consists of main vessel sections 46a and 46b (right and left), end caps 47a and 47b (right and left), and a center spacer 48. To avoid short-circuiting around the electrolyte the pressure (or vacuum) containment housing components should be a non-conductive material, lined with a non-conductive coating, or double-walled with a nonconductive inner vessel (not shown) providing the electrical isolation necessary to produce an electrically isolated condition with the desired circuit path maintained within the electrochemical cell.

A pressure differential is created between the higher pressure region 3-HP and the lower pressure 3-LP. The existence of this pressure differential is evidenced by the pressure gauges 6, 7. The pressure gauge 6 shows the pressure at the higher pressure region 3-HP and the second pressure gauge 7 shows the pressure at the lower pressure region 3-LP. It is noted that the term "pressure" also denotes a vacuum or partial vacuum condition. In the embodiment shown, the pressure differential is maintained by the resistance of the electrolyte (liquid or plasma) flow created by the pressure drop across the porous membranes 44 and 45. In the embodiment shown, the pressure value in the intermediate pressure region 43-IP, shown by a pressure gauge 49, is generally between the higher pressure region 3-HP and lower pressure region 3-LP. However, the electrolyte flow can be configured in any direction to achieve the desired pressure, chemistry, or temperature differentials and flow characteristics between the three regions. Pressure, temperature, and chemistry are all variable quantities within the three regions, 3-HP, 3-LP, and 43-MP, that can be made to differ by any known means.

The operational characteristics of the electrical current flow are the same as what is described for the embodiment shown in FIG. 1, and therefore will not be repeated here.

The cathode region port 13 is provided on one side of the cathodic electrode 1, allowing a first conductive fluid supply 50 to flow into or out of the conductive cathodic region 41 of the cell. The anode region port 15 is provided on one side of the anode electrode 2 allowing a second electrolyte supply 51 to flow into or out of the conductive anodic region 42 of the cell. A center spacer port 52 is provided in the center spacer 48 to allow a third conductive fluid 53 flow into or out of the conductive intermediate region 43-IP of the cell.

Fluid downstream, remote or away from the containment housing components (46, 47, 48) within the cathodic region port 13 and the anodic region port 15 could be non-ionized gas or conditioned by any means necessary to maintain electrical isolation of the conductive fluids within the containment housing components (46a, 46b, 47a, 47b, 48) in order to maintain the defined circuit. A discussion of such isolation techniques has been previously described in more detail with respect to FIGS. 1 through 4 of this application. This discussion includes the dielectric traps 26 and 27 shown in FIG. 3.

As shown in FIG. 5, in a preferred embodiment of the invention, the electrochemical cell is configured with a cathodic ionization electrode 54 and an anodic ionization electrode 55. The cathodic ionization electrode 54 is located in the end cap 47b of the conductive cathodic region 41 and the anodic ionization electrode 55 is located in the end cap 47a of the conductive anodic region 42. In the embodiment shown, the ionization electrodes 54 and 55 can be configured together in a single circuit (not shown) in which they ionize the gas between the two electrodes 54 and 55 similar to the filaments of a fluorescent light tube, with the electrical current travelling between the cathodic ionization electrode 54 and the anodic ionization electrode 55. In this instance, the terms cathodic and anodic do not represent the electrochemical function but rather the location of the ionization electrodes 54 and 55.

It is also noted that the cathodic ionization electrode 54 and the anodic ionization electrode 55 could operate on independent circuits and ionize gas in numerous preferred mechanisms including but not limited to electrostatic spark generator, plasma arc device, coated or uncoated filament, laser ionization device, heat source, glow-plug, radioactive ionization element, source of alpha, beta, or gamma ionization radiation, an electromagnetic wave source (including microwave, alternating current, direct current, radio frequency, light source) or any method capable of generating ions, ionized gas, or plasma.

FIG. 5 shows the use of O-ring seals 56 at various locations in the assembly of the containment housing components (46a, 46b, 47a, 47b, 48). Each use of an O-ring is not numbered directly because is presumed obvious that there are various sealing requirements to produce a pressure (vacuum) tight containment housing.

The embodiment of the invention shown in FIG. 5 shows the use of fluid release vents, including a cathodic side release vent 57 and an anodic side release vent 58. These vents are used in the event a liquid electrolyte is used in the electrochemical cell shown in FIG. 5, and would serve a similar function as the cathodic output vent 34 and anodic output vent 35, described in FIG. 3.

As shown in FIG. 5, in this preferred embodiment, an electrical isolation device 18 is provided between the both the cathode electrode 1 and the main containment vessel 46b, as well as between the anode electrode 2 and the main containment vessel 46a. In the same manner as described in FIG. 1, there would be electrical isolation between whatever circuit components are necessary to maintain the electrical current flow 9 along the desired and defined circuit. As previously discussed, according to standard conventions for the electrical circuit of an electrochemical cell, the electrical current 9 would flow through the conductor 10 from the cathode 1, through the ammeter 11, through the resistor 12 (representing the work conducted by the circuit), to the anode electrode 2, from the anode electrode 2 to the electrolyte of the conductive anodic region 42, through the lower pressure region 3-LP, through the lower density porous membrane 45, through the electrolyte of conductive intermediate region 43-IP, through the higher density porous membrane 44, to the electrolyte of the conductive cathodic region 41, through the higher pressure region 3-HP, to the cathode electrode 1, through the conductor 10, and again back to the ammeter 9, thus defining a complete circuit.

The voltage created by the invention, and the subsequent electrical current and power characteristics, are created by the density differential between the two half cells. This density differential is a function of the pressure, temperature, and chemical dissimilarities of the electrolytes and electrode materials occurring in each half cell. As described in the description of the embodiment of FIG. 3, the occurrence of gas evolution reactions at each of the electrodes 1 and 2 can produces gas flows which can be restricted, or prevented from escaping through the gas release vents 57 and 58 shown in FIG. 5, thus allowing the build-up of pressure within containment housing components 46, 47, 48. This would produce a self-perpetuating pressure energy, where the electrical energy is extracted from the intrinsic kinetic energy of the mass, of which energy's origin is likely to be the spirographic grid, as described in the inventor's publication previously mentioned in this application having the title " . . . The Fundamental Nature of the Universe".

Although the half cells described in the present invention are shown to be connected in series, the two half cells can alternately be arranged in parallel with one another.

The above information describes the general operation of a pressure density differential electrochemical cell. Unique to the present invention are liquid, gaseous, plasma, and solid electrolytes and electrodes occurring at different pressures to create a voltage or potential gradient, and the means to create these pressure differentials within the electrochemical cell.

Some benefits include:
- Ability to produce electrical energy from pressurized gas
- Ability to convert mechanical energy to electrical energy
- Potential to store large amounts of electrical energy in the form of pressurized gas
- Lightweight compared to other electrochemical cells
- More efficient than traditional electrochemical cells
- Can be made without precious or scarce materials
- Can be made without hazardous chemicals Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An electrochemical cell having a pressure differential between a cathode electrode region and an anode electrode region comprising:
    a first electrode included in a first half cell of the electrochemical cell;
    a second electrode included in a second half cell of the electrochemical cell;
    a first electrolyte contacting said first electrode;
    a second electrolyte contacting said second electrode;
    a containment vessel having a wall surrounding at least one of said first electrode and said second electrode, said wall also surrounding at least a portion of said first electrolyte and second electrolyte;
    a conductive membrane separating said first electrolyte from said second electrolyte; and
    a first means for producing a pressure differential between said first electrolyte and said second electrolyte to induce an electromotive potential between said first electrode and said second electrode; wherein said first means for producing a pressure differential includes a conduit provided with the containment vessel for producing said pressure differential between said first electrolyte and said second electrolyte, said conduit including a first end directly connected to the first half cell and a second end directly connected to the second half cell, wherein a pressure or vacuum source is connected to said conduit to produce said pressure differential.

2. The electrochemical cell in accordance with claim 1, wherein said first and second electrolytes are fluidic.

3. The electrochemical cell in accordance with claim 1, wherein said containment vessel surrounds both said first and second electrodes.

\* \* \* \* \*